United States Patent
Caskey et al.

(10) Patent No.: US 11,938,459 B2
(45) Date of Patent: Mar. 26, 2024

(54) ENHANCEMENT OF REDUCTION RESISTANCE FOR MANGANESE OXIDE ADSORBENTS

(71) Applicant: UOP LLC, Des Plaines, IL (US)

(72) Inventors: Stephen R. Caskey, Lake Villa, IL (US); Michael B. Hamoy, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 534 days.

(21) Appl. No.: 17/228,829

(22) Filed: Apr. 13, 2021

(65) Prior Publication Data

US 2021/0229065 A1 Jul. 29, 2021

Related U.S. Application Data

(62) Division of application No. 16/206,956, filed on Nov. 30, 2018, now Pat. No. 11,000,821.

(60) Provisional application No. 62/608,490, filed on Dec. 20, 2017.

(51) Int. Cl.
| | |
|---|---|
| *B01J 20/06* | (2006.01) |
| *B01D 53/02* | (2006.01) |
| *B01J 20/04* | (2006.01) |
| *B01J 20/30* | (2006.01) |
| *B01J 20/32* | (2006.01) |

(52) U.S. Cl.
CPC ............ *B01J 20/06* (2013.01); *B01D 53/02* (2013.01); *B01J 20/046* (2013.01); *B01J 20/3042* (2013.01); *B01J 20/3078* (2013.01); *B01J 20/3204* (2013.01); *B01D 2253/1124* (2013.01); *B01D 2253/25* (2013.01); *B01D 2256/24* (2013.01); *B01D 2257/30* (2013.01); *B01D 2257/55* (2013.01); *B01J 2220/42* (2013.01)

(58) Field of Classification Search
CPC ...... B01J 20/06; B01J 20/046; B01J 20/3042; B01J 20/3078; B01J 20/3204; B01J 2220/42; B01D 53/02; B01D 2253/1124; B01D 2253/25; B01D 2256/24; B01D 2257/30; B01D 2257/53
USPC ........................................................ 502/415
See application file for complete search history.

(56) References Cited

U.S. PATENT DOCUMENTS

| | | | |
|---|---|---|---|
| 11,000,821 B2* | 5/2021 | Caskey | ............... B01J 20/3042 |
| 2004/0109821 A1 | 6/2004 | Koyanaka | |

(Continued)

FOREIGN PATENT DOCUMENTS

| | | |
|---|---|---|
| CN | 103285805 A | 9/2013 |
| RU | 2164445 C1 | 3/2001 |
| RU | 2336944 C2 | 1/2006 |

(Continued)

OTHER PUBLICATIONS

Extended European Search report from European U.S. Appl. No. 18/890,812 dated Jul. 22, 2021.

(Continued)

*Primary Examiner* — Edward M Johnson

(57) ABSTRACT

Processes for removing arsenic compounds from a feed stream using an adsorbent in disclosed. The process includes contacting a feed stream comprising at least arsenic and sulfur compounds with an adsorbent comprising an low-crystallinity manganese oxide, at least one halide and a binder, to provide a treated effluent substantially free of the arsenic and sulfur compounds.

20 Claims, 6 Drawing Sheets

(56) References Cited

U.S. PATENT DOCUMENTS

2013/0202510 A1  8/2013  Kanazirev et al.
2016/0175806 A1  6/2016  Suib et al.

FOREIGN PATENT DOCUMENTS

WO      0216026 A2    2/2002
WO      2004072604 A2  8/2004
WO      2014201782 A1  12/2014

OTHER PUBLICATIONS

International Search Report and Written Opinion from corresponding PCT Application No. PCT/US2018/066634, dated Mar. 21, 2019.
International Preliminary Report on Patentablity from corresponding PCT Application No. PCT/US2018/066634, dated Jun. 23, 2020.

* cited by examiner

ENHANCEMENT OF REDUCTION RESISTANCE FOR MANGANESE OXIDE ADSORBENTS

CROSS-REFERENCE TO RELATED APPLICATION

This application is a divisional application of U.S. patent application Ser. No. 16/206,956 filed on Nov. 30, 2018, which claims priority from U.S. Provisional Application No. 62/608,490 filed Dec. 20, 2017, the contents of which cited application are hereby incorporated by reference in its entirety.

FIELD

The field of the subject matter relates to process for removing arsenic compounds, sulfur compounds, or both from a feed stream, and more particularly relates to using a low-crystallinity manganese oxide based adsorbent for removing arsenic compounds from a feed stream.

BACKGROUND

Low cost, safe adsorbents for arsine removal are needed in a variety of applications including treating cracked/refinery off gas feed stream, light hydrocarbon feedstocks being sent to polymerization catalysts and in the semiconductor industry to prevent arsine emissions where metal hydrides are used for production of semiconductor materials. Currently, the dominant adsorbent for arsine removal in treating cracked/refinery off gas feeds is lead oxide based. While lead oxide is not prone to reduction, it presents a number of challenges as it is more toxic, less environmentally friendly, and subject to increasing governmental regulation thus limiting application.

Copper oxide based adsorbents are also used for arsine removal but are not typically used for treating cracked/refinery off gas feeds due to the high potential for exothermic hydrogenation activity with feed components such as hydrogen and ethylene, propylene, and/or acetylene. Also, copper based adsorbents are more expensive relative to first row transition metals.

Further, the metal oxide oxidation state in such adsorbents is a critical determinant of reactivity. Retaining the desired metal oxidation state and the desired reactivity and functionality within a reducing environment such as environments containing hydrogen or hydrocarbon is particularly challenging. This is a prevalent problem in arsine removal from cracked and/or refinery off gas feedstock.

Therefore, there is a need for low cost and environmentally friendly alternative options for arsine removal. Further, there is a need for a novel adsorbent for arsenic and sulfur compounds removal which is less prone to deactivation and a method for enhancing the resistance to reduction of such adsorbents to reductants such as hydrogen. Further, there is a requirement for the high oxidation state of the metal oxides present in the adsorbent to be maintained for reaction with contaminants, thereby increasing the capacity for contaminants in reducing environments. Other desirable features and characteristics of the present subject matter will become apparent from the subsequent detailed description of the subject matter and the claims, taken in conjunction with the accompanying drawings and this background of the subject matter.

SUMMARY

Various embodiments contemplated herein relate to processes for removal of arsenic compounds from a feed stream. The exemplary embodiments taught herein illustrate a process for removing arsenic compounds from a feed stream using a novel low-crystallinity manganese oxide adsorbent and method of manufacturing the low-crystallinity manganese oxide adsorbent.

The present disclosure relates to adsorbents for the removal of trace elements from hydrocarbon stream and a process for their use. More particularly, it relates to an adsorbent for adsorbing mercury, arsenic, sulfur, metal hydrides and related compounds from a hydrocarbon stream, preferably a refinery off-gas stream, an olefinic or paraffinic stream and a process for its use. The present subject matter also relates to a process for the production of the adsorbent.

In accordance with an exemplary embodiment, an adsorbent is provided comprising a low-crystallinity manganese oxide in an amount of about 20 to about 80 wt %, at least one halide in an amount of about 0.25 to less than about 1.5 wt % and a binder.

In accordance with another exemplary embodiment, a method is provided for removing at least one of an arsenic compounds and sulfur compounds from a feed stream comprising contacting the feed stream with an adsorbent comprising an low-crystallinity manganese oxide in an amount of about 20 to about 80 wt %, at least one halide in an amount of about 0.25 to less than about 1.5 wt % and a binder, to provide an effluent comprising less than about 20 wppb of the at least one of the arsenic compounds and sulfur compounds In accordance with yet another exemplary embodiment, a method is provided for preparing an low-crystallinity manganese oxide adsorbent comprising preparing a mixture comprising a halide salt in an amount of about 0.25 to less than about 1.5 wt %, about 20 wt % to about 80 wt % manganese carbonate and a binder. The mixture is dried at about 100° to about 200° C. and is calcined until the manganese carbonate is decomposed to produce the low-crystallinity manganese oxide adsorbent.

These and other features, aspects, and advantages of the present disclosure will become better understood upon consideration of the following detailed description, figures and claims.

DETAILED DESCRIPTION

Figure 1:
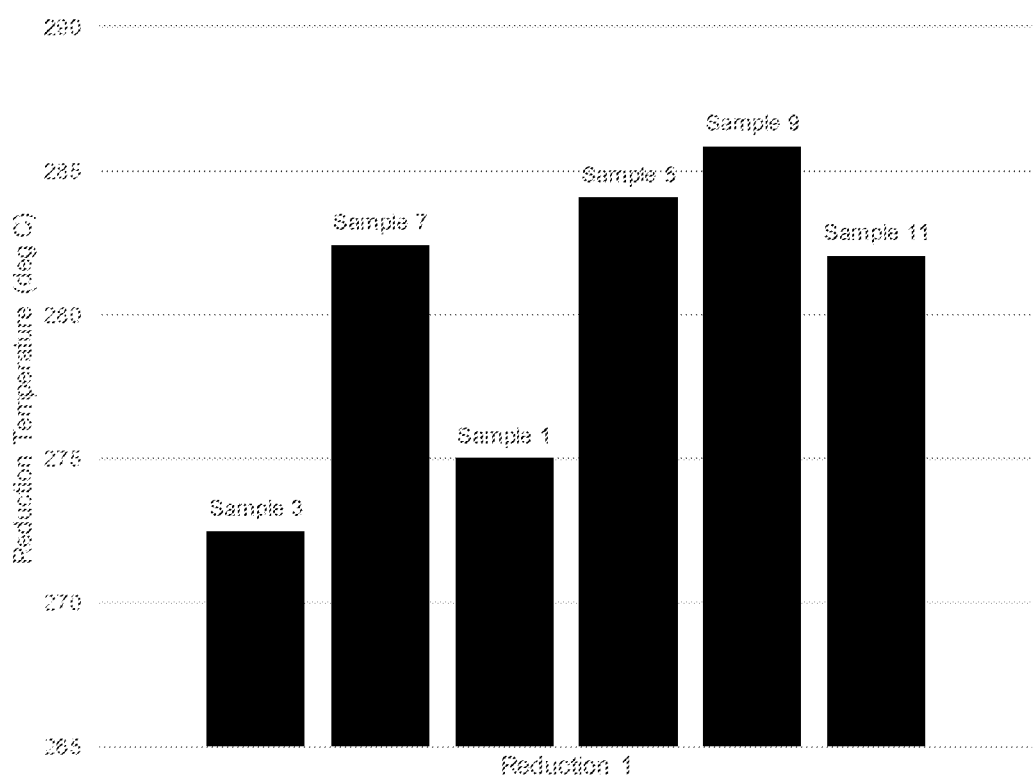
FIG. 1 shows a chart depicting the comparison of the reduction potential for adsorbents prepared according to an embodiment the present disclosure and a conventional adsorbents.

The following detailed description is merely exemplary in nature and is not intended to limit the various embodiments or the application and uses thereof. Furthermore, there is no intention to be bound by any theory presented in the preceding background or the following detailed description.

Furthermore, the illustration of the process of this invention in the embodiment is not intended to limit the invention to specific embodiments set out herein.

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, arsenic compounds and sulfur and nitrogen compounds. The stream can also include aromatic and non-aromatic hydrocarbons.

As used herein, the term "parts per million" may be abbreviated herein as "ppm" and unless otherwise specified it refers to "weight ppm", abbreviated herein as wppm.

As used herein, the term "parts per billion" may be abbreviated herein as "ppb" and unless otherwise specified it refers to "weight ppb", abbreviated herein as "wppb".

As used herein, the term "weight percent" may be abbreviated "wt %" and unless otherwise specified the notation "%" refers to "wt %".

As used herein, the term "substantially" can mean an amount of at least generally about 80%, or about 90%, and or about 99%, by mole, of a compound or class of compounds in a stream.

The present disclosure offers a novel adsorbent for removing arsenic compounds from a feed stream and a method to increase the resistance of manganese oxide based adsorbents against reduction by the addition of small amounts of an inorganic halide, such as sodium chloride to manganese carbonate followed by calcination for a sufficient time at a temperature in the range about 280° to about 600° C., or about 320° to about 480° C., or about 380° to about 420° C., sufficient to decompose the carbonate. These reduction resistant adsorbent show significant benefits in the removal of one or more contaminants from gas and liquid streams.

The process relates to the removal of arsenic compounds, such as arsenic hydride, often referred to as arsine, from hydrocarbon feedstocks such as refinery off-gas streams, using an adsorbent as described in the present disclosure. The process further relates to the removal of sulfur compounds, including at least one of $H_2S$, light mercaptans and carbonyl sulfide (COS). The arsine removal process of the present invention reduces the arsine concentration in the treated hydrocarbon feedstock to 20 parts per billion by weight (ppb) or 5-10 wppb or lower with similar reduction in the concentration of sulfur compounds that may be present in a hydrocarbon stream. The original arsine concentration in the feedstock may be as high as 1000 parts per million by weight (ppm) or higher depending upon the origin of the hydrocarbon feedstock.

The adsorbent may comprise manganese oxide, at least one halide and a binder. The manganese oxide may be present in a low-crystallinity phase. In various embodiments, manganese oxide may include manganese dioxide. The low-crystallinity manganese oxide may comprise an amount of at least 80 wt %, or at least wt % or about at least 99 wt % of the manganese dioxide. The amount of manganese oxide may vary from about 20 to about 80%, or from about 30 to about 50 wt % of the adsorbent. Further, the at least one halide may be present in an amount of about 0.25 to about 1.5 wt %, or from about 0.5 to about 1 wt % of the adsorbent. The binder may be selected from silicas, aluminas, silica-aluminas, clays, cements, and mixtures thereof. The halide may be chloride or bromide or mixture thereof. In an aspect, the adsorbent may be substantially free of binder.

The adsorbent as disclosed in the present disclosure may be prepared by any well-known method for production of this type of adsorbent product, such as coprecipitation, decomposition, impregnation and mechanical mixing. Further, the adsorbent may be produced by coprecipitation or decomposition.

In accordance with an exemplary embodiment, the process of preparing the low-crystallinity manganese oxide adsorbent may include preparing a mixture comprising a halide salt, manganese carbonate and a binder. Subsequently, the mixture is dried at about 100° to about 200° C. Thereafter, the mixture is calcined until the manganese carbonate is decomposed to produce the manganese oxide adsorbent. The mixture may be calcined at a temperature of about 380° to about 420° C. in the presence of air or nitrogen. In one aspect, the mixture may be calcined at a temperature of about 580° to about 620° C. in the presence of air or nitrogen. The halide salt is selected from sodium chloride, potassium chloride, ammonium chloride or mixtures thereof. Bromide salts are also effective. The halide salt is added either as a solid or dissolved in a solution of water. Various forms of manganese carbonate may be used which are well known in the art. Other manganese compounds such as manganese nitrate, manganese acetate and the like may also be used in addition to or in place of manganese carbonate in the mixture.

The halide salt may be mixed in an amount to have a halide concentration of from about 0.25 to less than about 1.5 wt %, or from about 0.5 to about 1 wt % halide in the manganese oxide adsorbent. The manganese carbonate may be present in an amount of from about 20 to about 80%, or from about 30 to about 50 wt % of the mixture. The mixture is formed by any suitable method including granulation, extrusion, co-nodulization, and accretion. Increasing the halide concentration above the upper disclosed limit of about 1.5 wt % results in diminishing effects of the associated advantages. Incorporating amounts of chloride at levels below the lower limit of about 0.25 or about 0.5 wt % does not provide any advantage. Accordingly, applicants have identified the chloride range which provides the desired results and advantages. The amount of chloride in adsorbent may be measured by analytical method UOP 291 method such as 291-02 Total Chloride in Alumina and Silica-Alumina Catalysts by Potentiometric Titration, UOP291-13 Total Chloride in Alumina and Silica-Alumina Catalysts by Microwave Digestion and Potentiometric Titration, UOP291-15 Total Chloride in Alumina and Silica-Alumina Catalysts by Microwave Digestion and Potentiometric Titration.

Applicants have found that the combination of the calcination environment and the calcination temperature along with the addition of halide plays a very significant role in obtaining the desired manganese oxide adsorbent. The presence of a halide component operates to maintain the desired oxidation state of the low-crystallinity manganese oxide adsorbent for a longer time under reducing conditions. The halide is ionically bonded to the surface of the adsorbent and blocks access to the active sites in the adsorbent prone to reduction. With active sites blocked, the adsorbent maintains the desired oxidation state of the metal for a longer period of time when in a reducing environment. In other words, the adsorbent's resistance to reduction is increased.

In operation, the feed stream comprising at least one of an arsenic compound and sulfur compound is contacted with the manganese oxide adsorbent to provide an effluent comprising less than about 20 wppb of the at least one of the arsenic compound and sulfur compound. The process may be carried out in an adsorption vessel containing one or more adsorption beds including the manganese oxide adsorbent.

One or more arsenic compounds, one or more sulfur compounds, or both are adsorbed from the feed stream on contact with the adsorbent, thereby providing an effluent stream substantially free of arsenic compounds, sulfur compounds, or both. Two adsorbent vessels, a first adsorbent vessel and a second adsorbent vessel, may be present in a configuration such as a lead and lag configuration. Once the adsorbent bed in the first vessel reaches breakthrough capacity, the feed stream will be routed around, or by-pass, the first vessel and may be passed to the second vessel. Meanwhile, the first adsorbent vessel may be replaced or regenerated for the next cycle. Online monitors, offline monitors, or both may be used to determine the amount of arsenic compounds in the effluent stream from the adsorbent vessel. Breakthrough capacity of a vessel may be determined by measurement of the arsenic compounds in the treated effluent. Such measurement may be completed by one or more sensors or analytical techniques. A control system may be used to switch the feed stream from one adsorbent vessel to another adsorbent vessel. The control system may include a processor and any suitable structure for interacting with one or more sensors and controlling one or more actuators. The control system could, for example, represent a multivariable controller, such as a Robust Multivariable Predictive Control Technology (RMPCT) controller or other type of controller implementing model predictive control (MPC) or other advanced predictive control (APC).

The contacting of feed stream with the adsorbent may take place at a temperature of about 15° to about 60° C., or from about 25° to about 45° C. and pressure of about 350 kPa (g) to about 3800 kPa (g), or from about 1380 kPa (g) to about 3800 kPa (g). Contacting at higher temperatures may cause deactivation of the adsorbent.

Applicants have found that presence of chloride in an amount as disclosed above enhances the resistance to reduction by +10 to +100° C. in reduction peak temperature depending on the manganese-oxide starting phase as illustrated in the examples below. At higher peak temperatures, previous adsorbents were prone to change the oxidation states from those having high adsorption capacity to those having low adsorption capacity. Presence of chloride allows higher reduction temperature without change in oxidation state which prolongs the presence of more desirable oxidation states having higher capacities for arsine and sulfur removal, such as $MnO_2$, for arsine removal thus enhancing capacities. The adsorbent is particularly useful in removing the hydride form of arsenic that poisons the catalyst even when this impurity is found in very low concentrations in hydrocarbon feed such as refinery off-gas streams. The findings were particularly surprising for a metal like manganese as it is more likely to reduce as it has more oxidation states as compared to metals like copper. In addition, the adsorbent is useful in applications where the adsorbent is not regenerated. The removal of $H_2S$, light mercaptans and COS is an advantageous use of the adsorbent.

EXAMPLES

Example 1

In a jar there was placed 30 g of manganese carbonate powder and 70 g of alumina. The dry powders were mixed well. This was followed by addition of 30 wt % water relative to the dry powder weight. The wet mixture was then mixed well. The jar was then sealed and the sample heated to 50° C. for 1 hr. The sample was then dried at 100° C. The dried powder was divided into 4 portions. The 4 samples were calcined at different conditions. Calcination conditions include 400° C. in an air atmosphere (Sample 1), 600° C. in an air atmosphere (Sample 2), 400° C. in a nitrogen atmosphere (Sample 3), and 600° C. in a nitrogen atmosphere (Sample 4).

Example 2

In a jar there was placed 29.5 g of manganese carbonate powder and 69.5 g of alumina. The dry powders were mixed well. Next sodium chloride was dissolved in water to an appropriate concentration to allow addition of 30 wt % sodium chloride/water solution to achieve 1 wt % sodium chloride on the final calcined solid. The wet mixture was then mixed well. The jar was then sealed and the sample heated to 50° C. for 1 hr. The sample was then dried at 100° C. The dried powder was divided into 4 portions. The 4 samples were calcined at different conditions. Calcination conditions include 400° C. in an air atmosphere (Sample 5), 600° C. in an air atmosphere (Sample 6), 400° C. in a nitrogen atmosphere (Sample 7), and 600° C. in a nitrogen atmosphere (Sample 8).

Example 3

In a jar there was placed 29.55 g of manganese carbonate powder and 68.15 g of alumina. The dry powders were mixed well. Next sodium chloride was dissolved in water to an appropriate concentration to allow addition of 30 wt % sodium chloride/water solution to achieve 1.5 wt % sodium chloride on the final calcined solid. The wet mixture was then mixed well. The jar was then sealed and the sample heated to 50° C. for 1 hr. The sample was then dried at 100° C. The dried powder was calcined at 400° C. in an air atmosphere (Sample 9).

Example 4

In a jar there was placed 29.4 g of manganese carbonate powder and 68.6 g of alumina. The dry powders were mixed well. Next sodium chloride was dissolved in water to an appropriate concentration to allow addition of 30 wt % sodium chloride/water solution to achieve 2 wt % sodium chloride on the final calcined solid. The wet mixture was then mixed well. The jar was then sealed and the sample heated to 50° C. for 1 hr. The sample was then dried at 100° C. The dried powder was calcined at 400° C. in an air atmosphere (Sample 10).

Example 5

Reduction potential of the samples prepared in Examples 1~4 were tested in a gravimetric balance under flow of 5% hydrogen/balance nitrogen. The samples of ~50 mg were first loaded to the gravimetric balance and dried at 450 C in nitrogen. The samples were then cooled to 100° C. under nitrogen flow. The gas feed was then switched to 5% hydrogen/nitrogen and the temperature was ramped at 5° C./min up to 450° C. The weight loss for the 5% hydrogen/nitrogen portion of the test is then plotted against the temperature. The derivative of the weight loss curve is considered when assessing the reduction peak. A reduction peak at lower temperatures indicates greater propensity for reduction.

Figure 2:
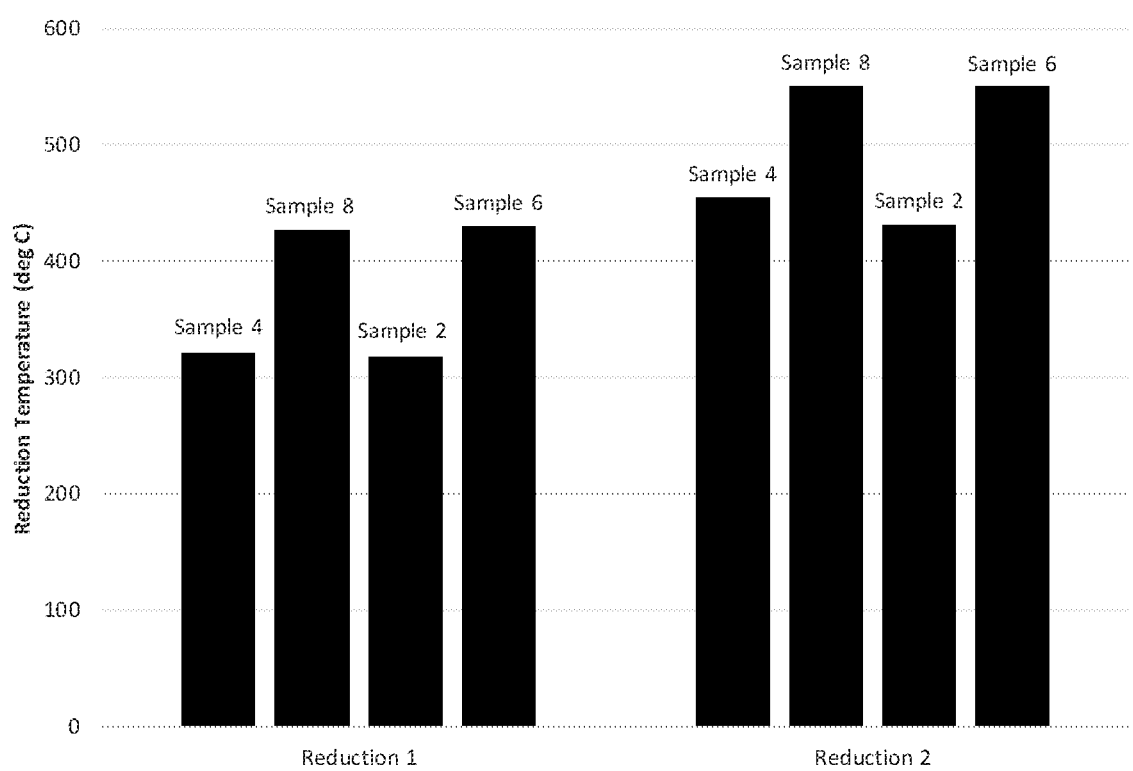
FIG. 2 shows a chart depicting the comparison of the reduction potential for adsorbents prepared according to another embodiment of the present disclosure and conventional adsorbents.

FIG. 1 shows comparison of the reduction potential for samples with and without added NaCl is shown in FIG. 1 for samples that were calcined at 400° C. The data shows a 10-15° C. difference in the peak of reduction temperature indicating that samples with added chloride have a slower rate of reduction. Addition of chloride above 1.5 wt % did not substantially change the peak reduction temperature FIG. 2 shows a chart of comparison of the reduction potential for samples with and without added NaCl is shown in FIG. 2 for samples that were calcined at 600° C. The data shows a ~100° C. difference in the peak of reduction temperature indicating that samples with added chloride have a slower rate of reduction.

Example 6

In a muller there was placed 158 grams of manganese carbonate powder and 197 g of alumina. The dry powders were mixed for 5 minutes. Next water was added until an extrudable dough was achieved (115 g). The dough was extruded as 16 inch cylinders. The formed pellets were dried at 100° C. The dried pellets were divided into 2 portions. The 2 samples were calcined at different conditions. Calcination conditions were 400° C. in an air atmosphere (Sample 11) and 600° C. in an air atmosphere (Sample 12).

Example 7

In a muller there was placed 158 grams of manganese carbonate powder, 194 g of alumina, and 2.5 g of sodium chloride. The dry powders were mixed for 5 minutes. Next water was added until an extrudable dough was achieved (115 g). The dough was extruded as 16 inch cylinders. The formed pellets were dried at 100° C. The dried pellets were divided into 2 portions. The 2 samples were calcined at different conditions. Calcination conditions were 400° C. in an air atmosphere (Sample 13) and 600° C. in an air atmosphere (Sample 14).

Figure 3:
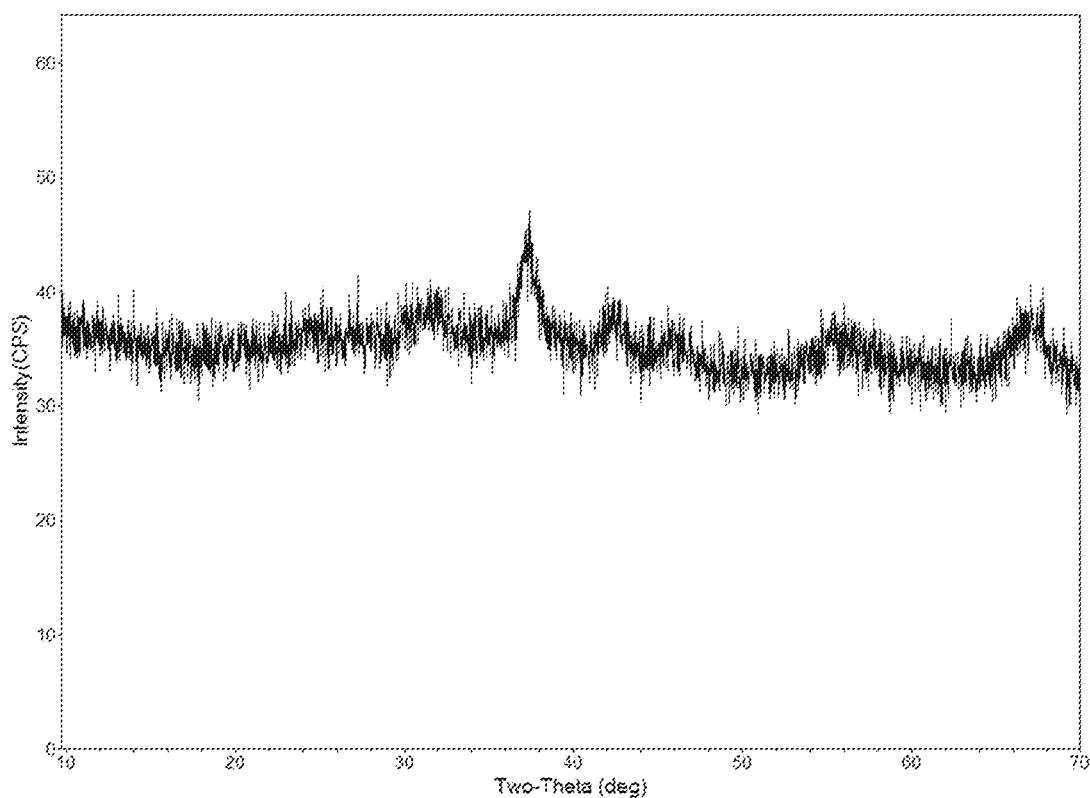
FIG. 3 shows XRD pattern for of a conventional adsorbent.
Figure 4:
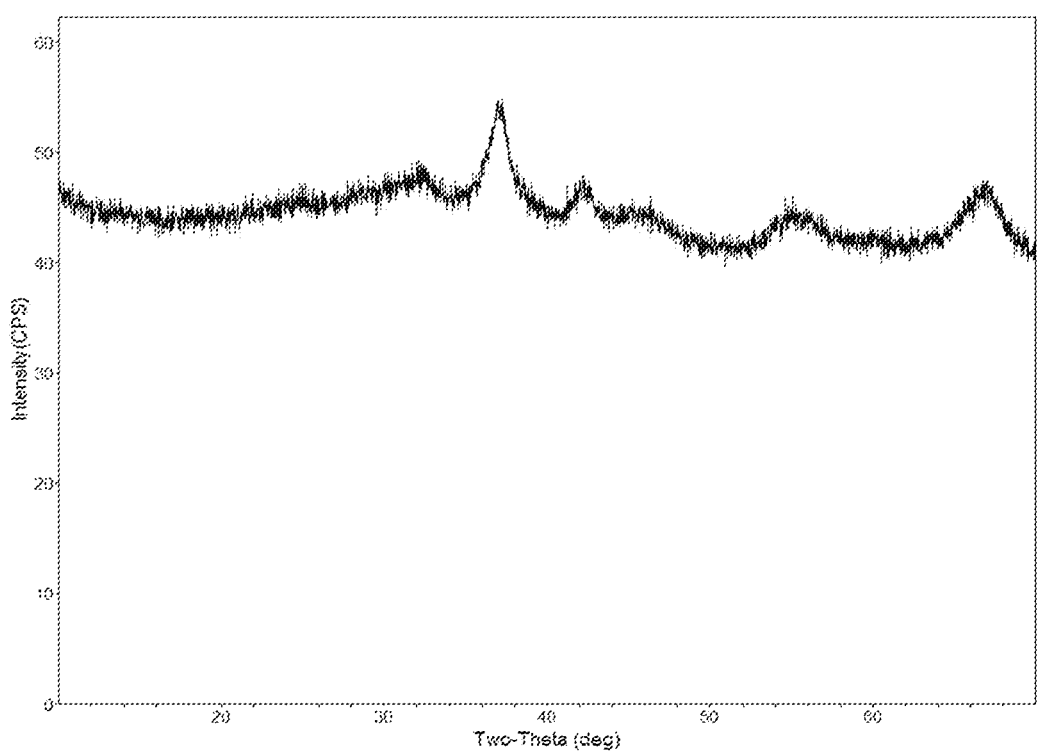
FIG. 4 shows XRD pattern for another adsorbent prepared according to an embodiment of the present disclosure.
Figure 5:
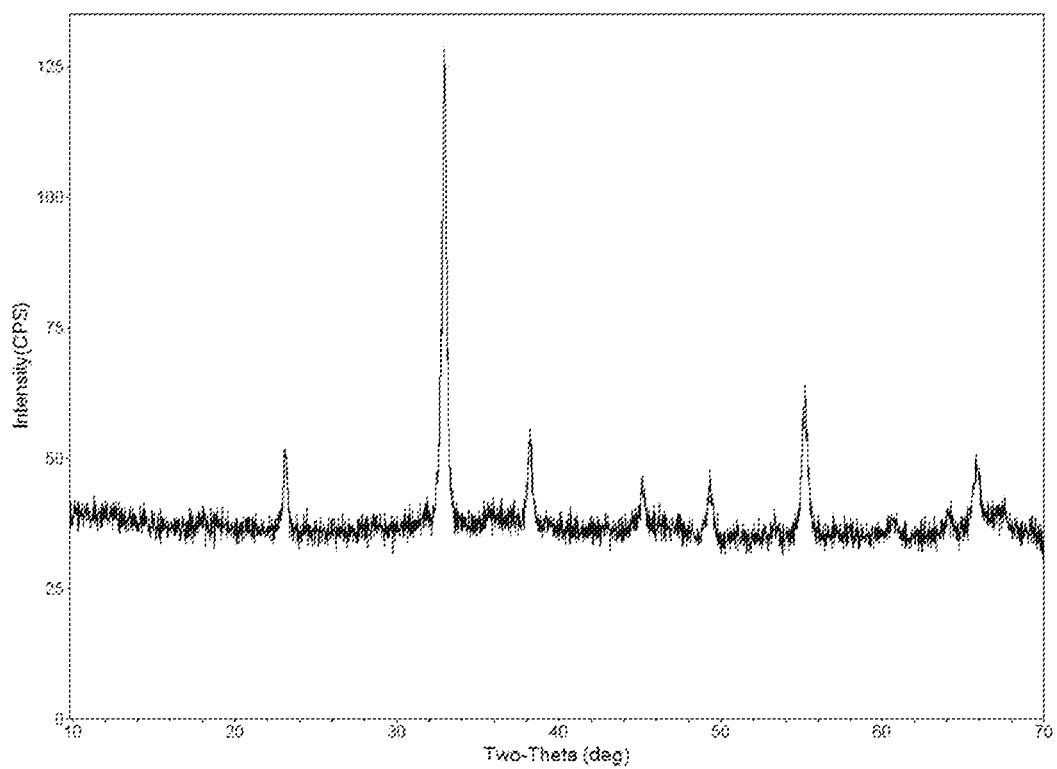
FIG. 5 shows XRD pattern for another adsorbent prepared according to an embodiment of the present disclosure.
Figure 6:
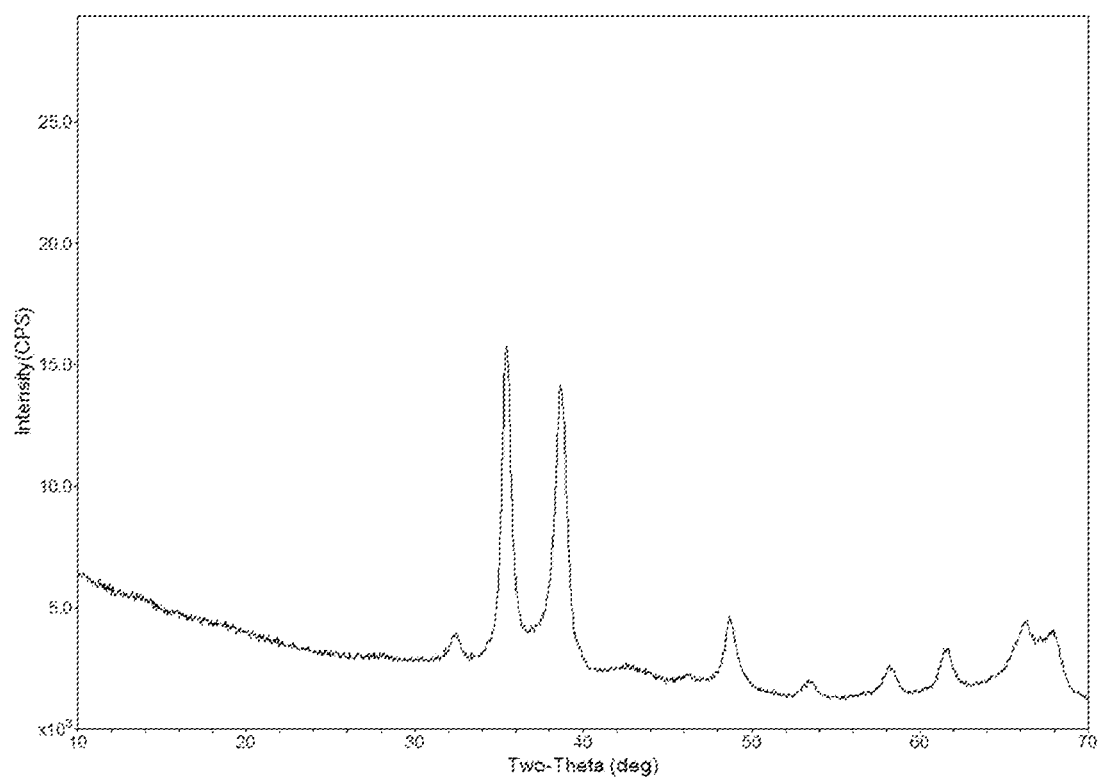
FIG. 6 shows XRD pattern of a conventional adsorbent.

X-ray diffraction (XRD) patterns of samples 11 and 13 are shown in FIG. 3 and FIG. 4. For comparison the XRD pattern of sample 14 and CuO/alumina/NaCl are shown in FIGS. 5 and 6, respectively. Table 1 shows comparison of the compositional analysis of samples with and without added chloride. Peak positions and peak height relative to background noise are shown in tables 2, 3, and 4. The peak height to background ratio for Samples 11 and 13 are low compared with Sample 14 and CuO/alumina/NaCl which is indicative of the low crystallinity nature of the samples.

X-ray diffraction patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "TO" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values.

Chloride content was analyzed by method UOP 291 such as 291-02 Total Chloride in Alumina and Silica-Alumina Catalysts by Potentiometric Titration, UOP291-13 Total Chloride in Alumina and Silica-Alumina Catalysts by Microwave Digestion and Potentiometric Titration, UOP291-15 Total Chloride in Alumina and Silica-Alumina Catalysts by Microwave Digestion and Potentiometric Titration, available through ASTM and was reported on an as produced basis without correction for loss on ignition.

TABLE 1

| Sample | Sample 11 | Sample 13 |
|---|---|---|
| % Mn | 25.8 | 24.4 |
| % Cl | 0.03 | 0.56 |

TABLE 2

| Peak | 2-Theta | d(Å) | Peak Height/Background Ratio |
|---|---|---|---|
| 1 | 32.3 | 2.77 | 1.04 |
| 2 | 37.0 | 2.43 | 1.15 |
| 3 | 42.2 | 2.14 | 1.07 |
| 4 | 55.2 | 1.66 | 1.14 |
| 5 | 66.9 | 1.40 | 1.04 |

TABLE 3

| Peak | 2-Theta | d(Å) | Peak Height/Background Ratio |
|---|---|---|---|
| 1 | 32.9 | 2.72 | 3.39 |
| 2 | 38.2 | 2.35 | 1.51 |
| 3 | 45.2 | 2.01 | 1.31 |
| 4 | 49.4 | 1.85 | 1.37 |
| 5 | 55.2 | 1.66 | 1.83 |
| 6 | 65.8 | 1.42 | 1.34 |

TABLE 4

| Peak | 2-Theta | d(Å) | Peak Height/Background Ratio |
|---|---|---|---|
| 1 | 32.5 | 2.75 | 1.34 |
| 2 | 35.4 | 2.53 | 3.98 |
| 3 | 38.7 | 2.33 | 3.45 |
| 4 | 48.7 | 1.87 | 2.14 |
| 5 | 53.4 | 1.72 | 1.46 |
| 6 | 58.2 | 1.58 | 1.71 |
| 7 | 61.6 | 1.50 | 1.80 |
| 8 | 66.2 | 1.41 | 1.35 |
| 9 | 67.9 | 1.38 | 2.34 |

Arsine removal capacity was tested in a flowthrough setup. A 108 ppm arsine spiked sample of $N_2$ was flowed through a reactor containing ~120 mg of adsorbent at a flow rate of ~28 sccm and ambient temperature (22° C.). The flow of arsine spiked nitrogen was continued until 0.2 ppm was achieved in the outlet as measured by a Honeywell Analytics Satellite XT arsine sensor. At this point the flow of spiked gas was stopped and pure nitrogen was introduced to ensure no physically adsorbed arsine was present. The spent adsorbent was removed and measured for arsenic content by inductively coupled plasma optical emission spectrometry (ICP-OES) or Inductively coupled plasma atomic emission spectroscopy (ICP-AES).

The weight percent arsine adsorbed based on breakthrough data are shown in table 5. The data indicates the fully oxidized low crystallinity Sample 13 has superior arsine removal capacity.

TABLE 5

| Adsorbent Type | Sample 13: MnO$_2$/ alumina (calcined 400° C. in air) | Sample 14: Mn$_2$O/ alumina (calcined 600° C. in air) |
|---|---|---|
| wt % AsH3 adsorbed | 1.5 | 0.1 |

Specific Embodiments

While the following is described in conjunction with specific embodiments, it will be understood that this description is intended to illustrate and not limit the scope of the preceding description and the appended claims.

A first embodiment of the invention is an adsorbent comprising an manganese oxide in an amount of about 20 to about 80 wt %, at least one halide in an amount of about 0.25 to less than about 1.5 wt % and a binder. An embodiment of the invention is one, any or all of prior embodiments in this paragraph up through the first embodiment in this paragraph, wherein manganese oxide is low crystallinity manganese oxide. An embodiment of the invention is one, any or all of prior embodiments in this paragraph up through the first embodiment in this paragraph, wherein the manganese oxide is present in an amount of about 30 to about 50 wt % of the adsorbent. An embodiment of the invention is one, any or all of prior embodiments in this paragraph up through the first embodiment in this paragraph, wherein the halide is present in an amount of about 0.5 to about 1 wt % of the adsorbent. An embodiment of the invention is one, any or all of prior embodiments in this paragraph up through the first embodiment in this paragraph, wherein the halide is a chloride or bromide or mixture thereof. An embodiment of the invention is one, any or all of prior embodiments in this paragraph up through the first embodiment in this paragraph, wherein the binder is selected from silicas, aluminas, silica-aluminas and mixtures thereof. An embodiment of the invention is one, any or all of prior embodiments in this paragraph up through the first embodiment in this paragraph, wherein the manganese oxide comprises manganese dioxide.

A second embodiment of the invention is a method for removing at least one of an arsenic compounds and sulfur compounds from a feed stream comprising contacting the feed stream with an adsorbent comprising a manganese oxide in an amount of about 20 to about 80 wt %, at least one halide in an amount of about 0.25 to about 1.5 wt % and a binder, to provide an effluent stream comprising less than about 20 wppb of the at least one of the arsenic compounds and sulfur compounds. An embodiment of the invention is one, any or all of prior embodiments in this paragraph up through the third embodiment in this paragraph, wherein manganese oxide is low crystallinity manganese oxide. An embodiment of the invention is one, any or all of prior embodiments in this paragraph up through the second embodiment in this paragraph, wherein the manganese oxide is present in an amount of about 30 wt % to about 50 wt % of the adsorbent. An embodiment of the invention is one, any or all of prior embodiments in this paragraph up through the second embodiment in this paragraph, wherein the halide is present in an amount of about 0.5 wt % to about 1 wt % of the adsorbent. An embodiment of the invention is one, any or all of prior embodiments in this paragraph up through the second embodiment in this paragraph, wherein the feed stream comprises one of methanol, natural gas, propylene, naphtha, refinery off-gas stream and light hydrocarbons. An embodiment of the invention is one, any or all of prior embodiments in this paragraph up through the second embodiment in this paragraph, wherein the contacting takes place at a temperature of about 1° to about 60° C. and pressure of about to about 350 kPa(g) to about 3800 kPa(g). An embodiment of the invention is one, any or all of prior embodiments in this paragraph up through the second embodiment in this paragraph, wherein the effluent comprises about 5 wppb to about 20 wppb of the at least one arsenic compounds and sulfur compounds.

A third embodiment of the invention is a method of preparing a manganese oxide adsorbent comprising preparing a mixture comprising a halide salt in an amount of about 0.25 to about 2 wt %, about 20 wt % to about 80 wt % manganese carbonate and a binder; drying the mixture at about 100° to about 200° C.; and calcining the mixture until the manganese carbonate is decomposed to produce the manganese oxide adsorbent. An embodiment of the invention is one, any or all of prior embodiments in this paragraph up through the third embodiment in this paragraph, wherein manganese oxide is low crystallinity manganese oxide. An embodiment of the invention is one, any or all of prior embodiments in this paragraph up through the third embodiment in this paragraph, wherein the mixture is calcined at a temperature of about 400° C. in air. An embodiment of the invention is one, any or all of prior embodiments in this paragraph up through the third embodiment in this paragraph, wherein the manganese oxide comprises manganese dioxide. An embodiment of the invention is one, any or all of prior embodiments in this paragraph up through the third embodiment in this paragraph, wherein the manganese oxide is present in an amount of about 30 to about 50 wt % of the adsorbent. An embodiment of the invention is one, any or all of prior embodiments in this paragraph up through the third embodiment in this paragraph, wherein the manganese oxide adsorbent comprises the halide in an amount of about 0.5 to about 1 wt % of the adsorbent. An embodiment of the invention is one, any or all of prior embodiments in this paragraph up through the third embodiment in this paragraph, wherein the halide salt is selected from the group consisting of sodium chloride, potassium chloride and ammonium chloride. An embodiment of the invention is one, any or all of prior embodiments in this paragraph up through the third embodiment in this paragraph, wherein the halide salt is added either as a solid or dissolved in a solution of water.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for removing at least one of an arsenic compounds and sulfur compounds from a feed stream comprising contacting the feed stream with an adsorbent comprising a manganese oxide in an amount of about 20 to about 80 wt %, at least one halide in an amount of about 0.25 to about 1.5 wt % and a binder, to provide an effluent stream comprising less than about 20 wppb of the at least one of the arsenic compounds and sulfur compounds.

2. The method of claim 1, wherein the manganese oxide comprises low crystallinity manganese oxide.

3. The method of claim 1, wherein the manganese oxide is present in an amount of about 30 wt % to about 50 wt % of the adsorbent.

4. The method of claim 1, wherein the halide is present in an amount of about 0.5 wt % to about 1 wt % of the adsorbent.

5. The method of claim 1, wherein the feed stream comprises one of methanol, natural gas, propylene, naphtha, refinery off-gas stream and light hydrocarbons.

6. The method of claim 1, wherein the contacting takes place at a temperature of about 15° to about 60° C. and pressure of about to about 350 kPa(g) to about 3800 kPa(g).

7. The method of claim 1, wherein the effluent comprises about 5 wppb to about 20 wppb of the at least one arsenic compounds and sulfur compounds.

8. The method of claim 1 wherein the manganese oxide comprises a low crystallinity manganese oxide is obtained from decomposing manganese carbonate to form the low crystallinity manganese oxide.

9. The method of claim 1 wherein the adsorbent adsorbs one or more arsenic compounds.

10. The method of claim 9 wherein the one or more arsenic compounds comprise arsenic hydride.

11. The method of claim 1 wherein the adsorbent adsorbs one or more sulfur compounds.

12. The method of claim 11 wherein the one or more sulfur compounds comprise at least one of $H_2S$, light mercaptans, and carbonyl sulfide.

13. The method of claim 1 wherein the halide comprises a halide salt.

14. The method of claim 1 wherein the halide is a chloride or bromide or mixture thereof.

15. The method of claim 1 wherein the binder is selected from silicas, aluminas, silica-aluminas and mixtures thereof.

16. The method of claim 1 wherein the manganese oxide comprises manganese dioxide.

17. A method for removing at least one of an arsenic compounds and sulfur compounds from a feed stream comprising contacting the feed stream with an adsorbent comprising a low crystallinity manganese oxide in an amount of about 20 to about 80 wt %, at least one halide salt in an amount of about 0.25 to about 1.5 wt % and a binder, to provide an effluent stream comprising less than about 20 wppb of the at least one of the arsenic compounds and sulfur compounds, wherein the manganese oxide comprises a low crystallinity manganese oxide is obtained from decomposing manganese carbonate to form the low crystallinity manganese oxide.

18. The method of claim 17, wherein the feed stream comprises one of methanol, natural gas, propylene, naphtha, refinery off-gas stream and light hydrocarbons; or wherein the contacting takes place at a temperature of about 15° to about 60° C. and pressure of about to about 350 kPa(g) to about 3800 kPa(g); or both.

19. The method of claim 1 wherein the manganese oxide comprises manganese dioxide.

20. The method of claim 1 wherein the adsorbent adsorbs: one or more arsenic compounds comprising arsenic hydride; one or more sulfur compounds comprising at least one of $H_2S$, light mercaptans, and carbonyl sulfide; or both.

* * * * *